United States Patent [19]

Nopper

[11] 3,919,560

[45] Nov. 11, 1975

[54] METHOD AND APPARATUS FOR LOCATING A CONTINUOUSLY MOVING WEB

[75] Inventor: Peter Nopper, Lyss, Switzerland

[73] Assignee: Zumbach Electronic-Automatic, Orpund, Switzerland

[22] Filed: Apr. 5, 1974

[21] Appl. No.: 458,420

[30] Foreign Application Priority Data
Apr. 19, 1973   Switzerland.......................... 5733/73

[52] U.S. Cl. ............... 250/557; 250/561; 318/577; 250/571
[51] Int. Cl.² ........................................ G01N 21/26
[58] Field of Search ........... 250/557, 202, 561, 571; 318/577

[56] References Cited
UNITED STATES PATENTS

| | | | |
|---|---|---|---|
| 2,230,715 | 2/1941 | Cockreil ......................... | 250/561 X |
| 2,356,567 | 8/1944 | Cockreil ......................... | 250/561 X |
| 2,792,504 | 5/1957 | Slamar et al. ..................... | 250/202 |
| 3,320,430 | 5/1967 | Gorman............................. | 250/557 |
| 3,527,953 | 9/1970 | Chitayat............................ | 250/561 |

Primary Examiner—Walter Stolwein

[57] ABSTRACT

A method and apparatus for guiding a continuously moving web in accordance with signals received from a photoelectric scanning means arranged to scan index means at a margin of the web, renders it possible to guide webs having index means both in the form of intermittent markings and continuous line markings by sampling only those output signals of the scanning means which occur during scanning of an index mark, and storing the sampled output signals in a storage means which provides a control signal for actuating a servo-control system for guiding the web. Methods and apparatus are described for sampling said signals by discriminating peak values of an output signal, by detecting pulses in the output signal corresponding to the presence of an index mark, and by metering increments of movement of the web corresponding to the spacing between index markings.

17 Claims, 3 Drawing Figures

METHOD AND APPARATUS FOR LOCATING A CONTINUOUSLY MOVING WEB

BACKGROUND OF THE INVENTION

1. Field of the Invention

This invention relates to a method and apparatus for locating a continuously moving web, and more especially to a method and apparatus for guiding a continuous web by means of lateral index means which may comprise intermittent markings or a continuous line.

2. Discussion of the Prior Art

In known methods and apparatus, such index means are scanned photoelectrically, and a mean value of an output signal from the scanning means is established which fluctuates continuously to a greater or lesser extent, the adjustment of the lateral position of the web being effected in accordance with this value by means of a servo-control system. In such known systems, however, there are considerable problems, especially if only intermittent index markings positioned at a considerable distance from each other are provided on the web. Thus, areas bearing impressions of varying nature which may also affect the value of any output signal from the scanning means may be situated between these markings, and in this case the value of the output signal is not dependent only upon the position of the index markings provided for control purposes, so that the control system is relatively insensitive and inaccurate. It is therefore impossible, or extremely difficult, to adapt a known web guiding means of the kind referred to for use with index means comprising both a continuous line and intermittent markings.

SUMMARY OF THE INVENTION

It is an object of the present invention to provide a method and apparatus for guiding a continuously moving web, which are applicable to webs having index means which may optionally be in the form either of intermittent markings or of continuous lines.

The invention is characterised in that momentary values, e.g. extreme values, of an output signal from the scanning means are stored and that the lateral position of the web is controlled by means of the stored signal values. By means of this storage of momentary signal values, in particular of extreme values, during the longitudinal movement of index markings below the scanner, the control of the web becomes independent of fluctuations of the signal value, which are not conditional upon the actual index markings. The momentary values which are to be stored may be determined either by spaced index markings or by index lines, i.e. one and the same measuring apparatus may be applied for all types of index markings encountered.

Other objects and advantages of this invention will become apparent upon reading the appended claims in conjunction with the following detailed description and the attached drawing.

DESCRIPTION OF THE PREFERRED EMBODIMENT

Figure 1:
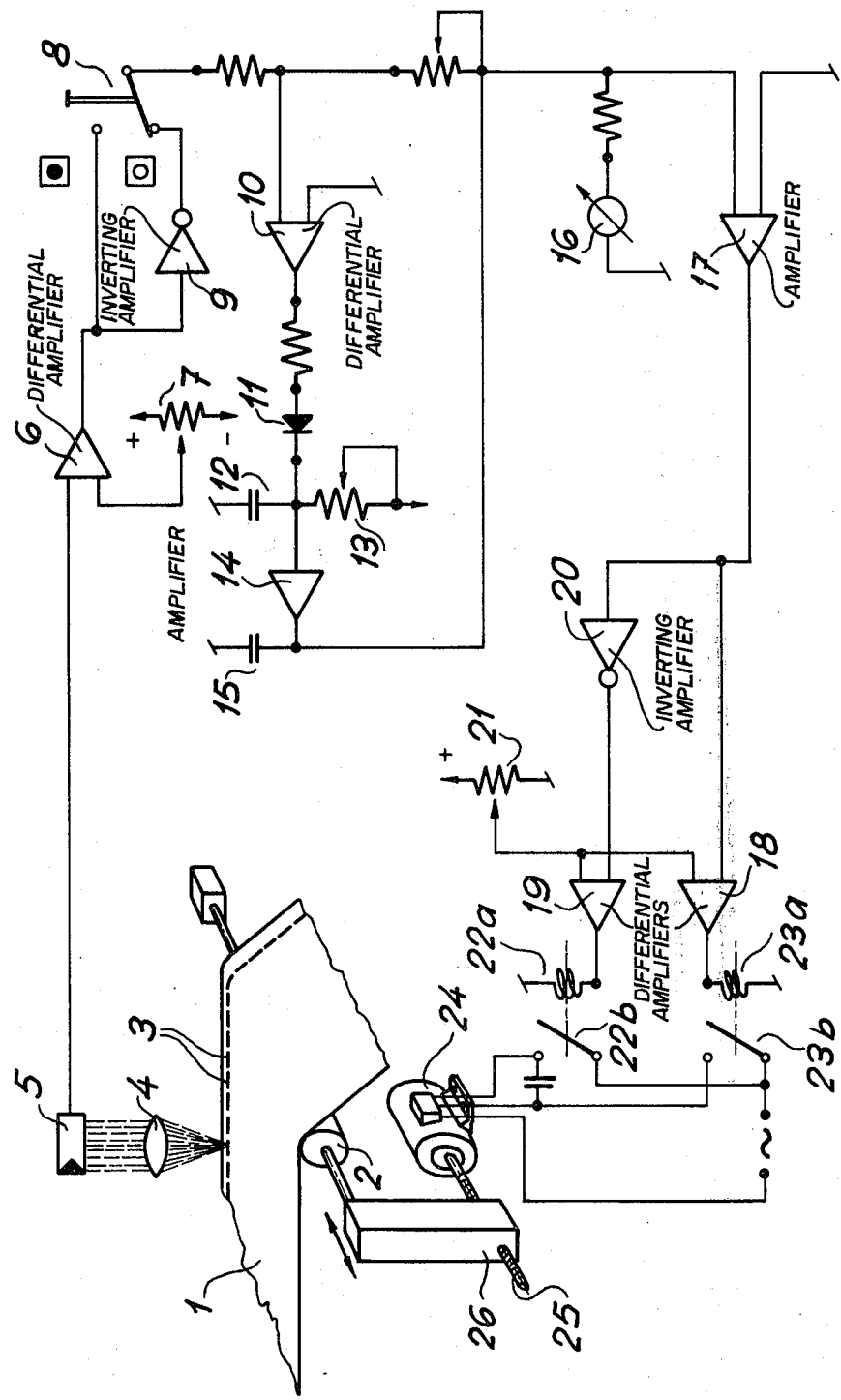
FIG. 1 shows schematically a first embodiment of the invention wherein the signal from a scanner is fed continuously to a storage means.

Referring to FIG. 1 of the drawings, a web 1 of flat material, for example of printed paper, is passed over a roller 2 and is laterally guided thereon in known manner which is not illustrated. In the direction of movement, the web 1 has side-index markings 3 spaced from each other and of which the brightness differs unmistakably from the brightness of the surrounding web.

An apparatus for guiding the web 1 comprises a scanner, which is indicated diagrammatically in FIG. 1 by a lens 4 and a photoelectric cell 5. The optical axis of this scanner is aligned on the axis of the side-index markings 3, i.e. in the correct lateral position of the web 1 with respect to the scanner 4, 5, the field scanned by the photoelectric cell 5 includes equal proportions of the image of a marking 3 and the image of a part of the web 1 situated laterally outwards from the marking. It will thus be understood that the total brightness sensed by the photoelectric cell 5 changes when the web 1 is displaced sideways with respect to the scanner 4, 5 and the markings 3 thereby momentarily amount to a greater or lesser portion of the area scanned by the photoelectric cell.

The signal generated by the photoelectric cell is fed to one input of a differential amplifier 6, and to the other input is applied a voltage which can be controlled by means of a potentiometer 7. It is thus possible to preselect the zero or desired position of the scanner axis with respect to the side-index markings 3 by purely electronic means. The output of the amplifier 6 is connected directly to one contact of a reversing switch 8 and to the other contact of this reversing switch via an inverting amplifier 9. Thus two complementary signal value outputs of opposite phase are provided which may selectively be connected by means of the reversing switch 8 to an amplifier 10, depending on whether light markings are scanned on a dark background or dark markings on a light background. In both cases, that signal value which assumes a maximum value during the scanning of the side-index markings 3 is that which is to be transmitted.

The signal amplified by the amplifier 10 passes through a rectifier 11 to a storage capacitor 12 which is discharged continuously through an adjustable resistance 13, the circuit formed by the capacitor 12 and resistance 13 having a relatively high time constant. The capacitor 12 is also connected to a high-resistance input terminal of an amplifier 14 the output of which is connected to a smoothing capacitor 15, a checking or controlling instrument 16 and an input of another amplifier 17. The output of the amplifier 17 is connected directly to an input of a threshold value amplifier 18, and by way of an inverting amplifier 20 to an input of a similar threshold value amplifier 19. The other inputs of the amplifiers 18 and 19 are supplied with a common voltage adjustable by means of a potentiometer 21. The outputs of the amplifiers 18 and 19 are connected to corresponding relay windings 23a and 22a, the relays having relay contacts 23b and 22b by means of which a source of alternating current can be connected to different terminals of a servo-motor 24, for example a reversible asynchronous single-phase motor, which renders it possible to displace the shaft of the roller 2 axially by means of a spindle 25 and of a nut 26, to correct the lateral position of the web 1 if need be.

FIG. 1 shows the apparatus in the inoperative condition or rather in the aligned condition, in which the optical axis of the scanner 4, 5 coincides with the one lateral edge of the markings 3 on the moving web. The signal value produced by the photoelectric cell 5 has a definite magnitude which is transmitted to the rectifier 11 through the amplifier 6, the reversing switch 8 and the amplifier 10. As already stated above, this signal value should be greater, i.e. more positive at the output terminal of the amplifier 10, than all values occurring during the scanning of the areas between the spaced index markings 3. The storage capacitor 12 is then accordingly charged through the rectifier 11 to this maximum measured value and kept at this measured value during the scanning of each individual index marking 3. During the scanning of the area between the index markings 3, the voltage across the storage capacitor 12 drops again a little, being charged up again to a maximum value during the scanning of the next index marking. This maximum value varies a little depending on whether the optical axis of the scanner 4, 5 actually does coincide precisely with the one lateral edge of the index markings in the manner described above, or whether this optical axis lies a little inwards or outwards from the markings. The storage capacitor 12 will accordingly be charged up to a slightly higher or slightly lower maximum value in each case. A uniform mean value of the voltage across the storage capacitor 12 will however appear in practice at the output terminal of the amplifier 14 or rather at the capacitor 15, this mean value again varying a little, depending on whether the web 1 runs precisely in the scheduled lateral position or slightly offset with respect to the latter. The mean value appearing at the capacitor 15 does not, however, represent the actual mean value derived from all measured values occurring during the longitudinal displacement of the web 1, but is a mean value of the maximum values determined and fed to the capacitor 11. This mean value is indicated by the instrument 16 and is fed directly to the threshold value amplifier 18 through the amplifier 17, and to the threshold value amplifier 19 through the inverting amplifier 20. The potentiometer 21 is adjusted in such a manner that neither of the amplifiers 18 and 19 operates at the actual value corresponding to correct positioning of the web, so that the relays 22 and 23 are de-energised and the servomotor 24 is switched off. In the case of a deviation of the said mean value in one direction or the other, correspondingly one or other of the amplifiers 18 and 19 responds, energises the corresponding relay 23 or 22 and starts the servo-motor 24 in the one direction or the other to displace the roller 2 laterally via the spindle 25 and thereby to correct the lateral position of the web 1.

The potentiometers 7, 13 and 21, as well as the potentiometer which provides feedback between the amplifiers 10 and 14 and thus determines the amplification, serve the purpose of adapting the apparatus to different brightness values of the index markings 3 and to different contrasts between these and the surrounding areas of the web.

Figure 2:
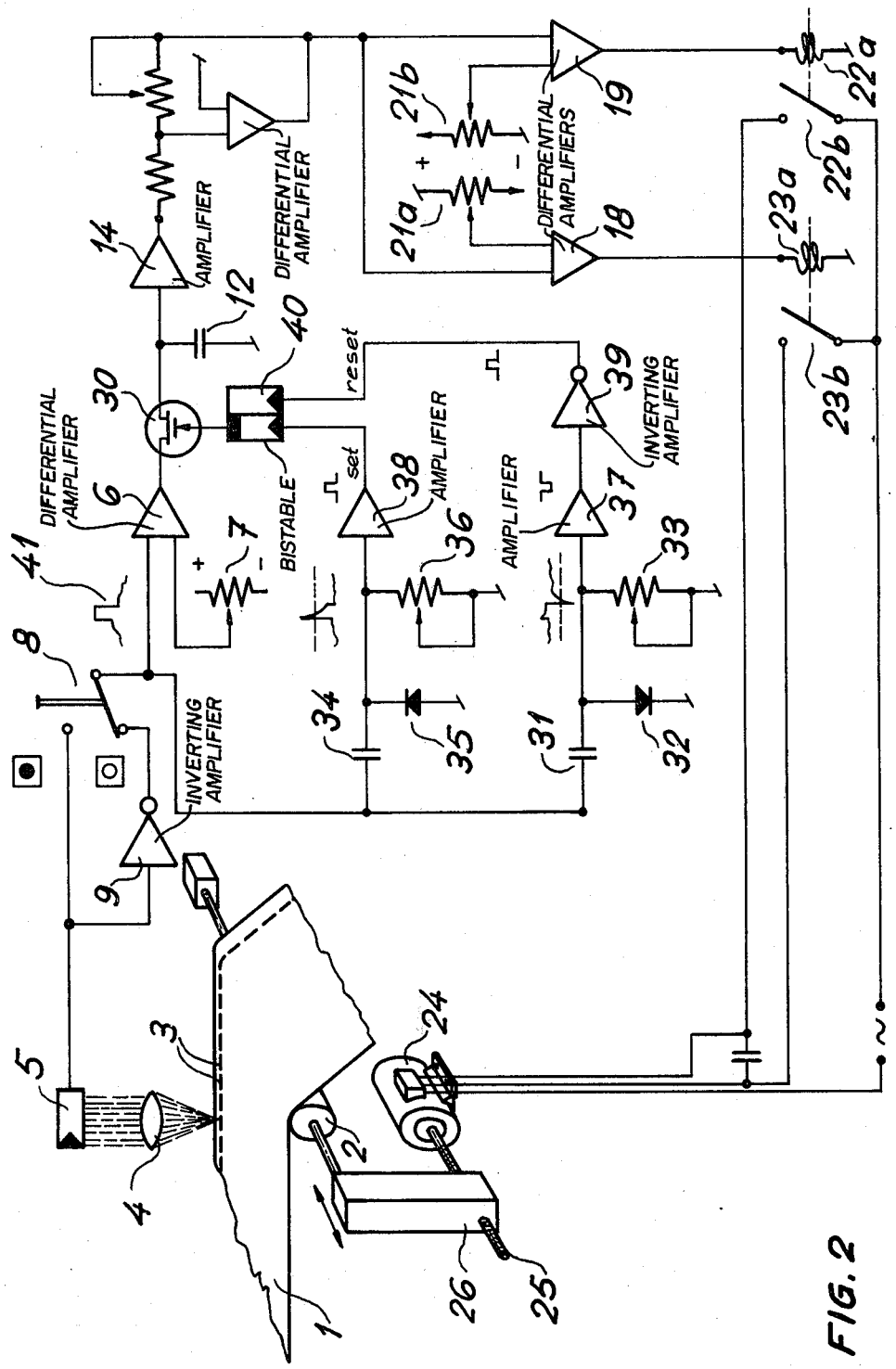
FIG. 2 shows schematically an embodiment of the invention wherein the signal input to a storage means is controlled by pulses in the signal from the scanner.

Referring to FIG. 2, corresponding parts of the apparatus bear the same reference numerals as in FIG. 1, and will not be referred to again in detail. The essential difference between the apparatus of FIG. 2 and the embodiment in accordance with FIG. 1 consists in that instead of the diode 11 which is situated between the amplifier 6 and the storage capacitor 12 and allows an adaptation of the voltage stored in capacitor 12 to a higher signal voltage, a controlled field effect transistor 30 is provided. This transistor 30 is controlled by means of a trigger circuit which in turn is controlled in response to the signal value itself. This trigger circuit comprises two parallel channels connected to a common input terminal and having differentiating elements of opposed polarity and comprising respectively on the one hand a capacitor 31, a diode 32 and an adjustable resistor 33, and on the other hand a capacitor 34, a diode 35 and an adjustable resistor 36. The differentiated signals pass through buffer amplifiers 37 and 38, and in the one case through an inverting stage 39, to the respective input terminals of a bistable 40 of which the output controls or drives the transistor 30.

With this circuitry, the steep flanks of a pulse 41 appearing during the scanning of an index marking 3 are differentiated in each case, the pulse occurring upon arrival of the leading flank of the pulse 41 being caused, via the amplifier 38, to set the bistable 40, whereas the pulse due to the trailing flank and passing through the amplifier 37 causes the bistable 40 to be reset. The transistor 30 thus becomes conductive for the duration of the scanning of an index marking and connects the output terminal of the amplifier 6 to the storage capacitor 12. During the scanning of a side-index marking, the storage capacitor 12 is thus charged to the signal voltage occurring at this time, and then remains constant again until the next switching of the transistor 30 to the conductive state. It is assured thereby that the output signal value of the scanner is actually registered only when it is affected by the index markings and not when it accidentally exceeds a predetermined peak value for other reasons. The measuring apparatus in accordance with FIG. 2 is thus suitable for use in cases in which a paper web, for example, is printed with patterns which during the scanning operation could generate signal values similar to those due to the index markings.

Figure 3:
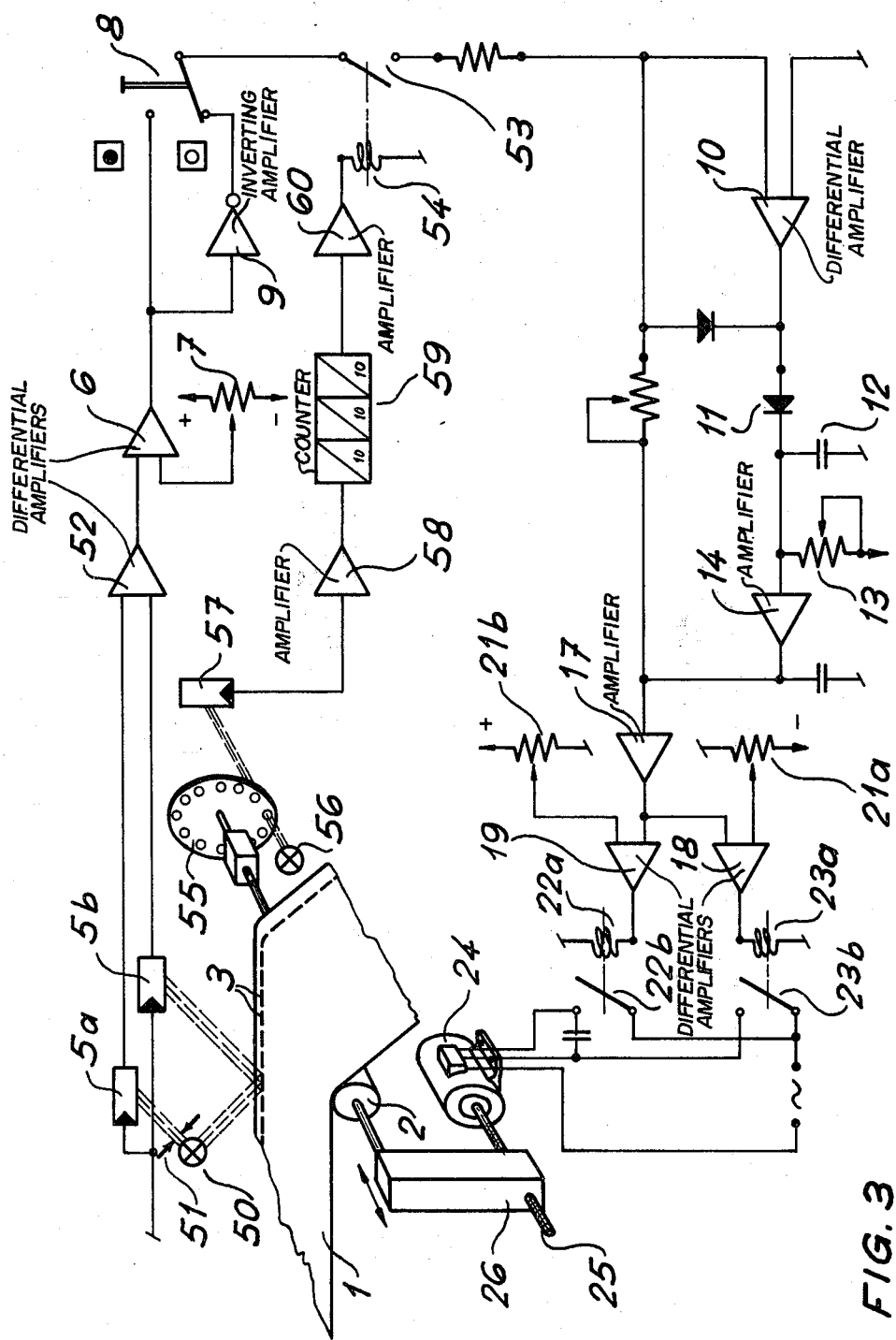
FIG. 3 shows schematically an embodiment of the invention wherein the signal input to a storage means is controlled as a function of the displacement of the web.

Referring to FIG. 3, corresponding parts of the apparatus are again indicated with the same numerals as in FIGS. 1 and 2 and will not be described in detail. In this case, the scanner is constructed a little differently. As shown diagrammatically, a bulb 50 illuminates both the area of the web 1 scanned by a photoelectric cell 5b, and also passes through an aperture 51 to a photoelectric comparison cell 5a. A differential input signal is thus produced directly in this case, and it is less complicated to equalise particular fluctuations in the intensity of illumination or perform an adaptation to a particular shade of the web 1 by adjustment of the aperture 51. The input signal amplified in a preamplifier 52 reaches the storage capacitor 12 in the manner described above through the amplifier 6 and either directly therefrom or through the inverting amplifier 9 in accordance with the setting of the switch 8. Another switch which is provided by a contact 53 of a relay having a winding 54 is situated between the switch 8 and the storage capacitor 12. A perforated disc 55 which interrupts a light beam from a light source 56 to a photoelectric cell 57 is situated on the shaft of the roller 2. The output of photoelectric cell 57 is amplified by an amplifier 58 and applied to the input of a counter 59 arranged to provide an output signal to the relay winding 54 through an amplifier 60, when the counter 59 reaches a predetermined count.

Apart from the slightly different construction of the scanner, the measuring operation is performed in substantially the same manner to that described with reference to FIG. 1. The connection between the amplifier 6 and the storage capacitor 12 is normally interrupted at the open switch 53. However, as the disc 55 revolves during longitudinal movement of the web 1 the light beam between the light source 56 and the photoelectric cell 57 is intermittently interrupted so that pulses are transmitted to the counter 59. The number of the pulses transmitted corresponds to a predetermined distance of travel of the web 1. When the counter has reached the present count, it transmits a pulse through the amplifier 60 to the relay winding 54 and is reset to zero at the same time. The switch 53 is thereby closed temporarily after the counting of a predetermined number of pulses, and connects the output terminal of the amplifier 6 to the input terminal of the capacitor 12, the capacitor 12 thus being charged to the signal value occurring at this moment. The counter 59 is so adjusted that the transmission of the signal value to the capacitor 12 occurs in each case during scanning of a definite point on the web 1 at which an index marking 3 is situated. Since the mutual spacing of the index markings is known, the counter 59 need only be adjusted so that it reaches its terminal value at the point when an index marking 3 in each case passes the scanner, and transmits a corresponding pulse through the amplifier 60 to the relay winding 54, whereupon the switch 53 transmits the signal occurring during the scanning of an index marking. This embodiment of the control system may be needed in a case in which the web 1 comprises spots between the side-index markings 3, so that the scanner generates a signal value which cannot otherwise be distinguished from the signal during the scanning of an index marking. In this case, the circuit in accordance with FIG. 2 would not be absolutely satisfactory.

Various modifications may be made to the illustrated embodiments of the invention. Thus the scanner according to FIG. 3 may be used in the other embodiments and, conversely, a scanner corresponding to FIG. 1 or FIG. 2 could be used in the embodiment in accordance with FIG. 3. The switch 53 of FIG. 3 could be replaced by an electronic switch, for example by a transistor 30, in accordance with FIG. 2. The kind of storage means may be selected as desired in the case of all embodiments, i.e. a storage circuit of the nature illustrated in FIG. 2 could, for example, also be applied in the circuit corresponding to FIG. 3. Furthermore, instead of the electromechanical reversing control system for the servo-motor 24, it would be possible to incorporate a purely electronic control system for a direct current servo-motor.

What is claimed is:

1. A method of guiding a continuous web, comprising the steps of providing an electro-optical detecting means having no movable parts, optically detecting the position of a margin of the web whereby a direct-voltage measuring signal is derived indicative of the lateral position relatively to said electro-optical detecting means of index means marked on said web by scanning the web in its longitudinal direction repeatedly, sampling values of said direct-voltage measuring signal corresponding to the presence of an index mark within the range of said electro-optical detecting means, transmitting said sampled values to a storage means for continuously storing maximum values of said direct-voltage measuring signal and actuating a servo control system for laterally positioning the web in accordance with the signal value contained in said storage means.

2. A method of guiding a continuously moving web, comprising the steps of providing electro-optical scanning means without movable parts, optically scanning a series of index markings spaced along a margin of the web whereby as said index markings pass the scanning means there are derived corresponding momentary direct-voltage peak output signal values indicative of the lateral position of each index mark relatively to the scanning means, transmitting said peak output signal values to a chargeable and dischargeable storage means of which the discharging time constant is substantially longer than the interval between the occurrence of consecutive peak output signal values whereby the signal value contained in said storage means at any given time is proportional to the preceding peak signal value, and actuating a servo control system for laterally positioning the web in accordance with the signal contained in said storage means.

3. A method of guiding a continuously moving web, comprising the steps of optically scanning a series of index markings spaced along a margin of the web whereby as said index markings pass the scanning means there are derived corresponding distinct momentary signal components the values of which indicate the lateral position of the corresponding index markings relatively to the scanning means, monitoring the continuous output signal from said scanning means in order to detect said signal components, actuating in response to the presence of a detected signal component a switch means connected between said scanning means and a storage means, whereby only said momentary signal components are transmitted to said storage means, and actuating a servo-control system for laterally positioning the web in accordance with the signal value contained in said storage means.

4. A method according to claim 3, wherein said momentary signal components comprise signal pulses, the step of monitoring said continuous output signal is carried out by differentiating said signal to obtain control signals corresponding to the leading and trailing flanks of said signal pulses, and the said switch means is actuated by applying said control signals to respective inputs of a bistable circuit for controlling said switch means.

5. A method of guiding a continuously moving web, comprising the steps of optically scanning a series of index markings spaced along a margin of the web whereby as said index markings pass the scanning means there are derived corresponding momentary signal values indicative of the lateral position of the corresponding index markings relatively to the scanning means, metering the longitudinal movement of the web in order to detect increments of movement of the web corresponding to the spacing between index markings thereon, upon completion of each increment of movement of the web transmitting the corresponding output signal value of the scanning means to a storage means whereby the signal value contained in said storage means at any given time corresponds to the value of the output signal from the scanning means during scanning of the preceding index marking, and actuating a servocontrol system for laterally positioning the web in accordance with the value contained in said storage means.

6. An apparatus for guiding a continuous web, comprising a servo-control mechanism adapted to adjust the lateral position of the web, a fixed photoelectric scanning means without movable parts adapted to provide a direct voltage output signal indicative of the lateral position relatively thereto of index mark means on said web, means for sampling values of said output signal corresponding to the presence of an index mark within the range of said scanning means, and a storage means adapted to store maximum values of said output signal connected to said sampling means, said storage means providing a control signal to said servocontrol mechanism for laterally positioning said web.

7. An apparatus according to claim 6, wherein said servo-control mechanism includes a pair of servo amplifiers arranged in opposition in order to control a servo motor, means being provided for transmitting to said servo amplifiers signals derived from said storage means and inverted in sign relatively to one another.

8. An apparatus according to claim 6, wherein said photo-electric scanning means comprises a photosensitive means connected to one input of a differential amplifier, and means applying an adjustable reference voltage to the other input of said differential amplifier.

9. An apparatus according to claim 6, wherein said photo-electric scanning means includes signal amplifier means providing complementary signals at two outputs thereof, and a changeover switch is provided between said amplifier means and said storage means to enable optional selection of one of said signals.

10. An apparatus for guiding a continuous web, comprising a servo-control mechanism for adjusting the lateral position of the web, fixed photoelectric scanning means adapted to provide at an output thereof a direct-voltage signal indicative of the lateral position relatively thereto of an index mark means on said web, a direct-current amplifier having an input connected to the output of said scanning means and having a low impedance output, a diode having an input connected to the low impedance output of said amplifier, a capacitor connected to be charged through said diode to maximum values of said direct-voltage signal and to discharge through a high resistance discharge circuit, and means for transmitting to said servo-control mechanism a control signal dependent upon the value stored in said capacitor.

11. An apparatus according to claim 10, wherein the resistance of said discharge circuit is adjustable 12. An apparatus for guiding a continuous web, comprising a servo-control mechanism for adjusting the lateral position of the web, a photoelectric scanning means adapted to provide at an output thereof a signal indicative of the lateral position relatively thereto of index mark means on said web, a switch means having an input connected to the output of said scanning means and an output connected to a storage means providing a control signal to said servo-control mechanism, and a trigger circuit adapted to detect signal pulses occurring in the output signal from said scanning means and to close said switching means during said signal pulses.

13. An apparatus according to claim 12, wherein said switch means comprises an electronic switch.

14. An apparatus according to claim 13, wherein said electronic switch comprises a field effect transistor.

15. An apparatus according to claim 13, wherein said trigger circuit comprises a differentiating circuit for detecting leading and trailing flanks of pulses occurring in the output signal from said photoelectric scanning means and a bistable arranged to control said electronic switch and of which respective inputs are connected to receive control signals derived from said leading and trailing flanks respectively.

16. An apparatus for guiding a continuous web, comprising a servo-control mechanism for adjusting the lateral position of the web, a photoelectric scanning means adapted to provide at an output thereof an output signal indicative of the lateral position relatively thereto of spaced index marks on said web, a switch means having an input connected to the output of said scanning means and an output connected to an input of a storage means providing a control signal to said servo-control mechanism, means for measuring the longitudinal movement of said web, and means, controlled by said measuring means, for momentarily closing said switch means at predetermined increments of movement of said web.

17. An apparatus according to claim 16, wherein said measuring means comprises a perforated disc coupled to a web transport roller, a light source arranged on one side of said disc, a photoelectric cell arranged on the other side of said disc in order to generate output signal pulses in accordance with the rotation of said disc, and a counter for counting said output signal pulses, the output of said counter being connected to a control input of said switch means.

* * * * *